US009600458B2

(12) United States Patent
Guzman et al.

(10) Patent No.: US 9,600,458 B2
(45) Date of Patent: Mar. 21, 2017

(54) OVERRIDING STYLE RULES FOR STYLING WEB ELEMENTS

(75) Inventors: Eric Guzman, Santa Clara, CA (US); Jose Antonio Marquez, Milpitas, CA (US)

(73) Assignee: Google Technology Holdings LLC, Mountain View, CA (US)

(*) Notice: Subject to any disclaimer, the term of this patent is extended or adjusted under 35 U.S.C. 154(b) by 674 days.

(21) Appl. No.: 13/517,802

(22) Filed: Jun. 14, 2012

(65) Prior Publication Data
US 2013/0339844 A1  Dec. 19, 2013

(51) Int. Cl.
G06F 7/00 (2006.01)
G06F 17/22 (2006.01)
G06F 17/30 (2006.01)

(52) U.S. Cl.
CPC ...... G06F 17/227 (2013.01); G06F 17/30905 (2013.01)

(58) Field of Classification Search
CPC .. G06F 17/2247; G06F 17/227; G06F 17/218; G06F 17/30905; G06F 17/212; G06F 7/00
USPC .................................................. 715/235, 236
See application file for complete search history.

(56) References Cited

U.S. PATENT DOCUMENTS

| 8,176,416 B1* | 5/2012 | Williams ............ G06F 17/2247 715/243 |
| 2002/0013792 A1* | 1/2002 | Imielinski ............. G06F 17/218 715/239 |
| 2006/0224607 A1* | 10/2006 | Tchaitchian et al. ......... 707/101 |
| 2009/0031211 A1* | 1/2009 | Yao et al. ..................... 715/234 |
| 2012/0278700 A1* | 11/2012 | Sullivan et al. .............. 715/235 |

FOREIGN PATENT DOCUMENTS

GB  2429815 A  3/2007

OTHER PUBLICATIONS

Sourceforge, "Open @ Adobe", May 24, 2012, http://sourceforge.net/adobe/wiki/Projects/, 3 pages.
CSS Selectors. "What Happens When Conflicts Occur?" May 24, 2012, http://css.maxdesign.com.au/selectutorial/advanced_conflict.htm, 3 pages.

* cited by examiner

*Primary Examiner* — Scott Baderman
*Assistant Examiner* — Hassan Mrabi
(74) *Attorney, Agent, or Firm* — McDermott Will & Emery LLP

(57) ABSTRACT

Methods and systems are provided for styling elements of a web document at a time of rendering the web document. In one embodiment, a method comprises: performing steps on a processor. The steps comprise: identifying a rule associated with a property of an element of the web document; determining whether the rule is to be grouped with multiple elements of the web document; generating an overriding rule when the rule is associated with multiple elements of the web document; and updating a style sheet based on the overriding rule.

20 Claims, 6 Drawing Sheets

OVERRIDING STYLE RULES FOR STYLING WEB ELEMENTS

TECHNICAL FIELD

The present disclosure generally relates to methods, systems and computer program products for styling elements in a web document.

BACKGROUND

Cascading style sheets provide website developers with control over the visual appearance, style, and positioning of text and other elements in web pages. Cascading style sheets typically include instructions or rules that describe how a browser should render any instance of a particular element on a webpage. For example, style sheets can provide instructions for how hypertext headers, links, or text should appear on the webpage. Developers may use cascading style sheets to create templates for cascading these style properties and rules to structured documents. The use of cascading style sheets separates the coordination of the style of the documents from the content of the document, thereby simplifying web authoring and site maintenance.

The style sheets are referred to as cascading because multiple style sheets can be applied to a same webpage. When multiple rules exist in one or more style sheets that are applied to a webpage, multiple rules may apply to a single element. In such a case, cascading style sheets assign a weight or specificity to each style rule and the rule with the greatest weight takes precedence.

In order to dynamically stylize an element at runtime, an "inline" declaration can be used directly on the content of the document, as opposed to within a style sheet. This is convenient because the declaration has more specificity than style declarations in any of the rules in the style sheet. However, an "in-line" style declaration will only affect a single element, and cannot be reused by other elements. Additionally, "in-line" styles are applied directly to elements, which mean they are not contained within style sheet objects.

Accordingly, it is desirable to provide methods and systems were users may style elements dynamically using cascading style sheets. Furthermore, other desirable features and characteristics of the present disclosure will become apparent from the subsequent detailed description and the appended claims, taken in conjunction with the accompanying drawings and the foregoing technical field and background.

SUMMARY

A method is provided for styling elements of a web document at a time of rendering the web document. In one embodiment, the method comprises: performing steps on a processor. The steps comprise: identifying a rule associated with a property of an element of the web document; determining whether the rule is to be grouped with multiple elements of the web document; generating an overriding rule when the rule is associated with multiple elements of the web document; and updating a style sheet based on the overriding rule.

A system is provided for styling elements of a web document at a time of rendering the web document. In one embodiment, the system includes a first module that identifies a rule associated with a property of an element of the web document. A second module determines whether the rule is to be grouped with multiple elements of the web document and generates an overriding rule when the rule is associated with multiple elements of the web document. A third module updates a style sheet based on the overriding rule.

A computer program product is provided for styling elements of a web document at a time or rendering the web document. In one embodiment, the computer program product comprises a tangible storage medium readable by a processing circuit and storing instructions for execution by the processing circuit for performing a method. The method comprises: identifying a rule associated with a property of an element of the web document; determining whether the rule is to be grouped with multiple elements of the web document; generating an overriding rule when the rule is associated with multiple elements of the web document; and updating a style sheet based on the overriding rule.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description.

Figure 1:
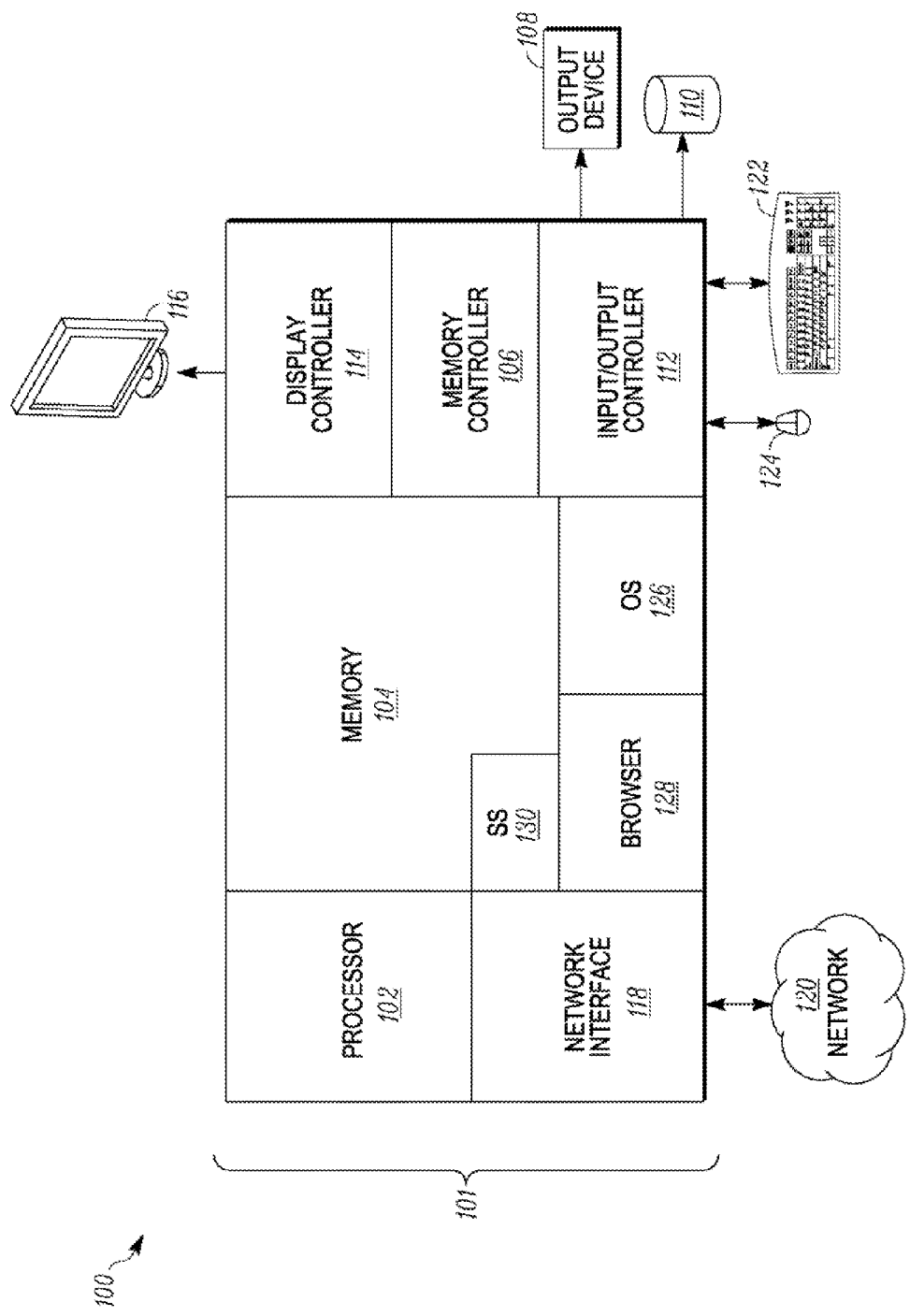
FIG. 1 is a functional block diagram illustrating a computing system that includes a styling system in accordance with exemplary embodiments.

Turning now to the drawings in greater detail, it will be seen that in FIG. 1 an exemplary computing system 100 includes a styling system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device that includes a memory and a processor. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122 and mouse 124 can be coupled to the input/output controller 112. In an exemplary embodiment, the computing system 100 can further include a network interface 118 for coupling to a network 120. The network 120 transmits and receives data between the computer 101 and external systems.

In various embodiments, the memory 104 stores instructions that can be performed by the processor 102. The instructions stored in memory 104 may include one or more separate programs, each of which comprises an ordered listing of executable instructions for implementing logical functions. In the example of FIG. 1, the instructions stored in the memory 104 include an operating system (OS) 126 and a browser application 128. The operating system 126 essentially controls the performance of other computer programs and provides scheduling, input-output control, file and data management, memory management, and communication control and related services. The browser 128 enables users to access, retrieve, and view web documents and other resources on the internet by interpreting and rendering web documents.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The processor 102 executes the instructions of a styling system (SS) 130 of the present disclosure. In various embodiments, the styling system 130 of the present disclosure is stored in the memory 104 (as shown), is run from a portable storage device (e.g., CD-ROM, Diskette, Flash Drive, etc.) (not shown), and/or is run from a remote location, such as from a central server (not shown).

Generally speaking, the styling system 130 generates web documents that, when analyzed by the browser 128, stylize elements of a web document. The styling system 130 may be implemented as part of the browser 128, or may be implemented as a stand-alone application that is run at or before the time of rendering the web document by the browser 128.

In various embodiments, the styling system 130 performs styling methods to identify a dominant rule for a particular style property of a particular element. An element, for example, may be any element defined in the web document, such as, but not limited to a heading, an image, a table, a link, etc. The element may have a class or ID attribute, and may be of a particular type such as, but not limited to, a paragraph, an image, etc. Style properties, for example, may include, but are not limited to, font, font size, font color, background color, etc.

The styling system 130 performs the styling methods to identify a dominant rule amongst a plurality of related rules, determine if the dominant rule is associated with multiple elements, and, in some instances, create an overriding rule for styling the element at run-time. In various embodiments, the dominant rule is used to style the element and/or an overriding rule is provided as a rule of a cascading style sheet (CSS) that is associated with the web document to style the element.

Figure 2:
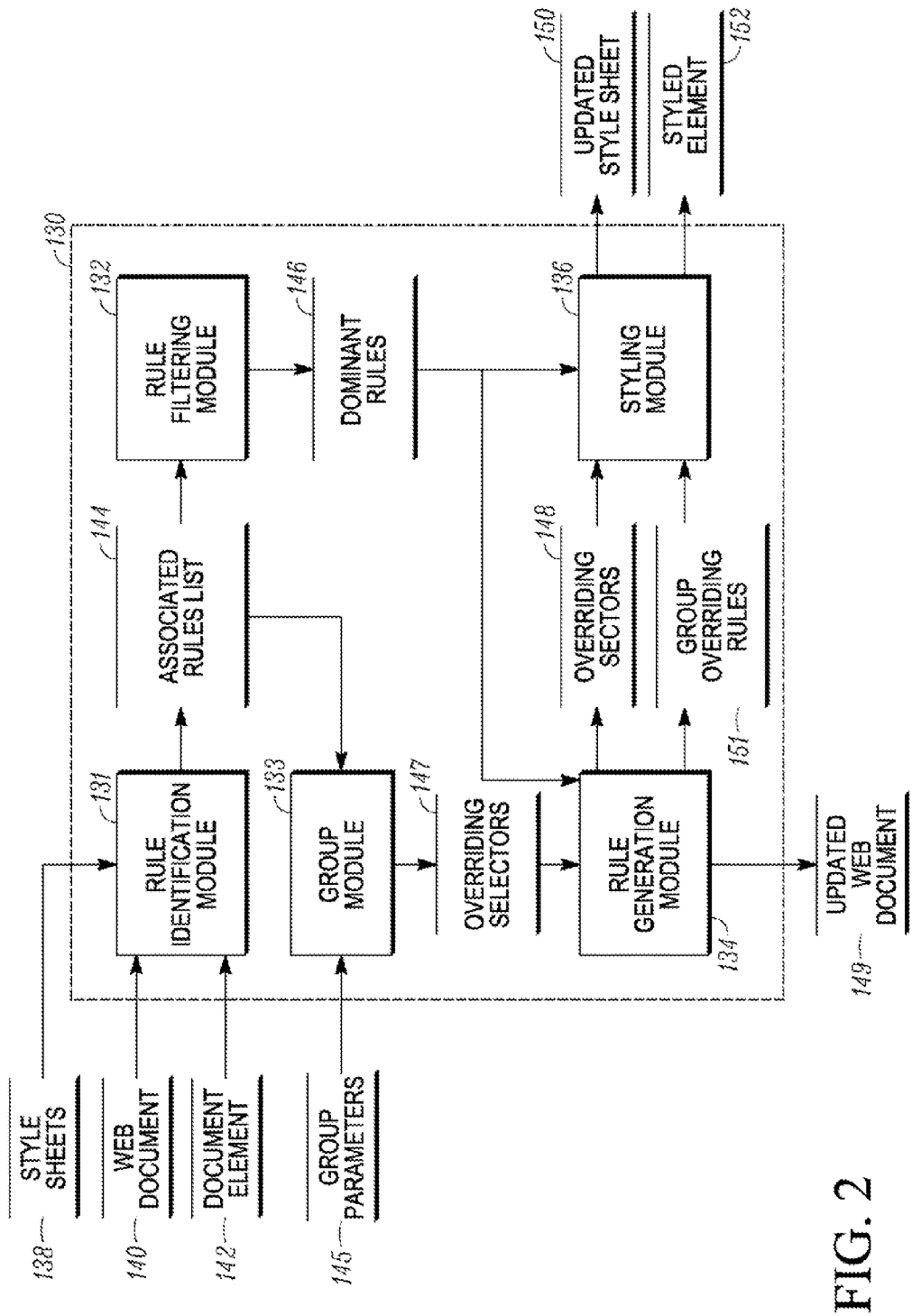
FIG. 2 is a dataflow diagram illustrating the styling system in accordance with exemplary embodiments.

Turning now to FIG. 2, the styling system 130 is shown in more detail in accordance with exemplary embodiments. The styling system 130 can include one or more submodules and datastores. As can be appreciated, the submodules can be implemented as software, hardware, firmware, a combination thereof, and/or other suitable components that provide the described functionality. As can further be appreciated, the sub-modules shown in FIG. 2 can be combined and/or further partitioned to similarly evaluate style sheets for dominant rules at run-time. In various embodiments, the styling system 130 includes a rule identification module 131, a rule filtering module 132, a group module 133, a rule generation module 134, and a style sheet generation module 136.

The rule identification module 131 receives as input one or more style sheets 138 associated with a web document 140, and either the web document 140 or a particular element or list of elements 142 of the web document 140. In various embodiments, when the rule identification module 131 receives the web document 140, the rule identification module 131 evaluates the web document 140 to determine a particular element or a list of elements 142 within the web document 140.

Based on the element or list of elements 142 that is either received or determined, the rule identification module 131 evaluates the style sheets 138 to identify rules that are associated with the element(s) 142. For example, the style sheets 138 may include multiple rules for styling multiple properties of a particular element. The rule identification module 131 determines that the rule is associated with the element and further determines that the rule is associated with a property of the element. The rule identification module 131 generates an associated rules list 144 based on the elements, their properties, and their associated rules (e.g., in the form of a three-dimensional array storing the element(s), the properties, and the rules.)

The filtering module 132 receives as input the associated rules list 144. The filtering module 132 evaluates the associated rules list 144 and determines if no rule exists for a property of an element, if a single rule exists for a property of an element, or if multiple rules exist for a property of the element. If no rule exists, the filtering module 132 generates a dominant rule 146 for the property of the element based on another rule associated with that property for another element. In various embodiments, the filtering module 132 generates the dominant rule 146 based on another rule of another element that has a highest specificity.

If a single rule is associated with the property, the filtering module 132 designates that rule as the dominant rule 146. If multiple rules are associated with the property, the filtering module 132 applies one or more filters to the multiple rules to determine a dominant rule 146. For example, the filtering module 132 determines if multiple rules exist for a single property of a single element of the associated rules list 144. If multiple rules exist, the filtering module 144 applies one or more filters to the rules for that property to determine the dominant rule 146.

In various embodiments, the filters include, but are not limited to, an important filter, a single-target filter, and a highest priority filter. The important filter filters out all rules that do not include an indication of importance (e.g., an "important" flag in CSS). The single-target filter filters out all rules that do not apply to a single target (e.g., rules that apply to multiple elements within the web document 140). The highest priority rule filters out all rules that have a priority lower than a determined highest priority. The priority may be determined based on a specificity designated in the rule of the style sheet 138.

As can be appreciated, the order in which the filtering module 132 applies the filters may vary in accordance with various aspects of the present disclosure. In various embodiments, the filtering module 132 may first apply the important filter to the rules of the associated rules list 144, may then apply the single-target filter to the important rules, if multiple single-target rules exist, and may then apply the highest priority filter to the important single target rules, if single target rules exist. If any of the filters that are performed first produce a zero result, then a subsequent filter is performed on the entire associated rules list 144, as opposed to a filtered list.

The grouping module 133 receives as input a group enabled flag 145, and the associated rules list 144. When the group enabled flag 145 indicates that grouping is intended (i.e., multiple elements are to use the same rule for styling a particular property), the rules for the properties are processed to determine an overriding selector 147 with a highest specificity for each element to be grouped.

The rule generation module 134 then receives as input the dominant rule(s) 146, and the overriding selectors 147. The rule generation module 134 evaluates the dominant rule(s) 146 to determine if the dominant rule(s) 146 is associated with multiple elements. The rule generation module 134 determines if the dominant rule(s) 146 is associated with multiple elements based on the selector associated with the rule. For Example, if the selector of the rule is associated with other elements, then the dominant rule is associated with multiple elements.

If a particular dominant rule 146 affects multiple elements, the rule generation module 134 generates an overriding rule 148 based on the dominant rule 146. For example, the rule generation module 134 generates an overriding rule 148 that ensures the rendering of the element according to the dominant rule 146.

To create an overriding rule 148, the rule generation module 134 extracts the rule's selector (in the case of grouped, comma-delimited selectors, it takes the rule with highest specificity targeting the element in question), and selects a last descendant selector and replaces the last descendant selector (i.e., either a class or attribute selector) with a new class selector. The new class selector can be any string name and may be predefined, randomly generated, or generated as a combination of other information. The new selector, is then used in the overriding rule 148, and will cause the overriding rule 148 to have equal or more specificity than the original rule. The rule generation module 134 then updates the web document 149 with the new class selector by appending the new class selector to the element's class attribute.

The rule generation module 134 then evaluates the overriding selectors 147 to generate a group overriding rule 151. The group overriding rule includes each of the overriding selectors 147 in a comma delimited list. The comma delimited list is then used as the new overriding selector in the process discussed above.

The styling module 136 receives as input the dominant rule(s) 146, the overriding rules(s) 148, and the group overriding rule(s) 149. The styling module 136 styles the element directly by generating styled element 152 and/or generates an updated style sheet 150 to style the element indirectly. When generating an updated style sheet 150, the styling module 136 incorporates the dominant rules 156, the overriding rule(s) 148, and/or the group overriding rule(s) 151 into the existing style sheets 138 or creates a new style sheet. The updated style sheet 150 is then used to render the element according to the new rule(s).

Figure 3:
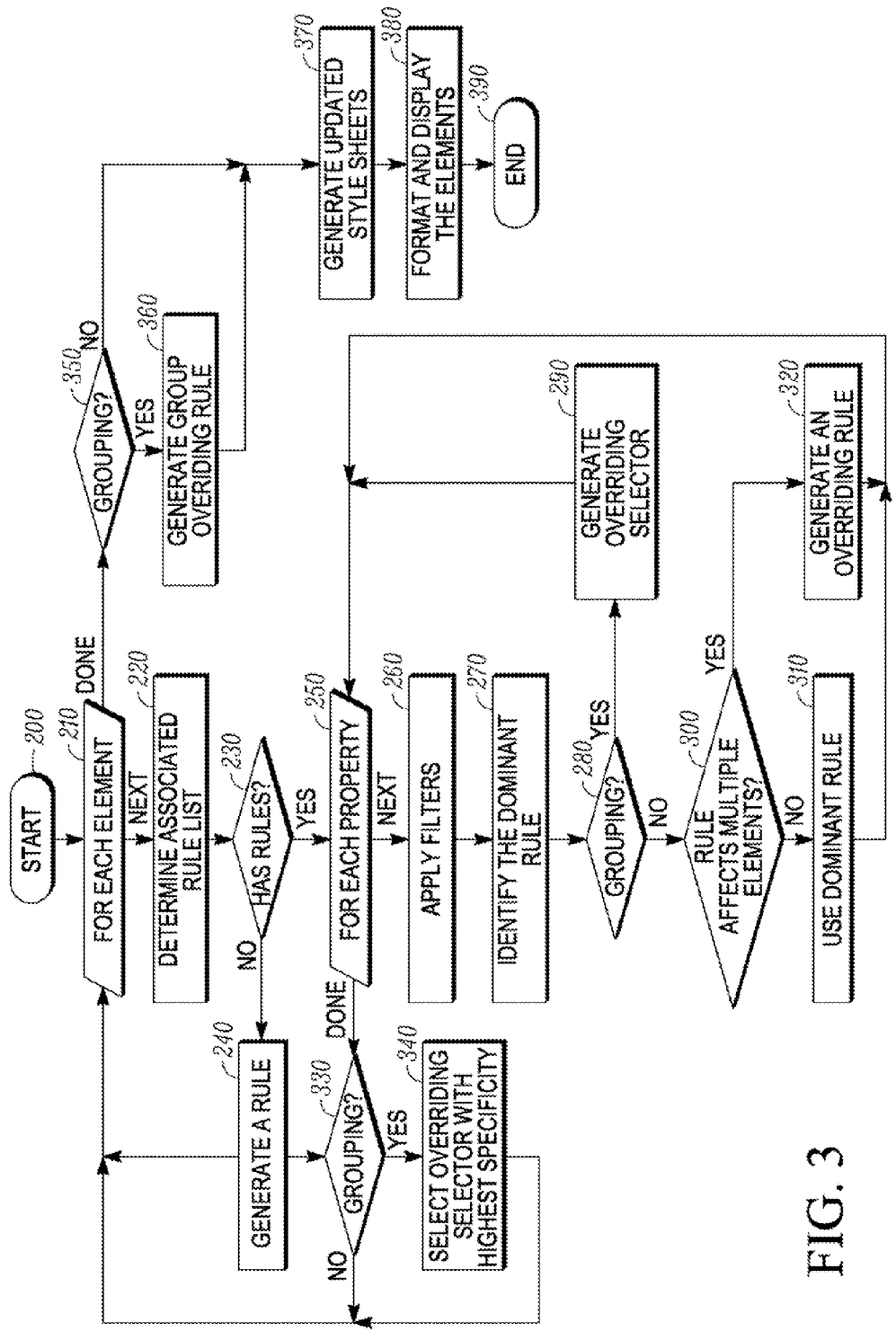
FIGS. 3-6 are flowcharts illustrating a styling method in accordance with exemplary embodiments.
Figure 4:
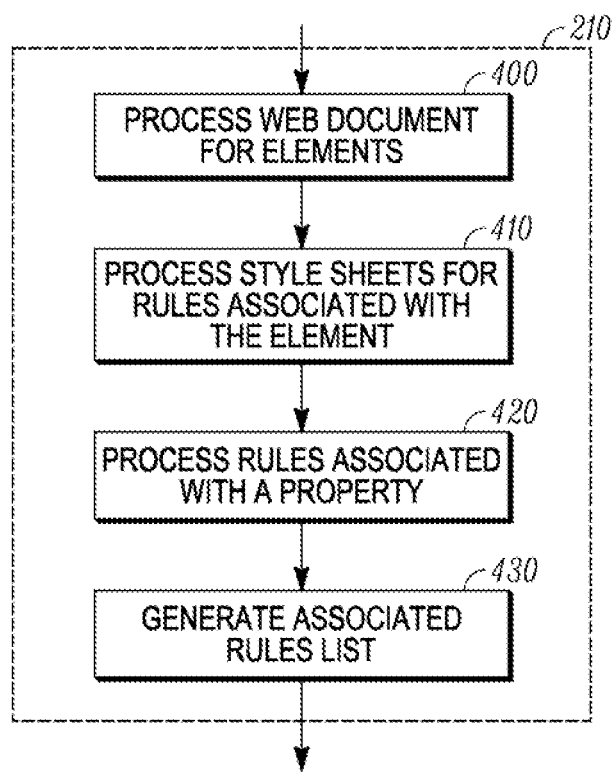
Figure 5:
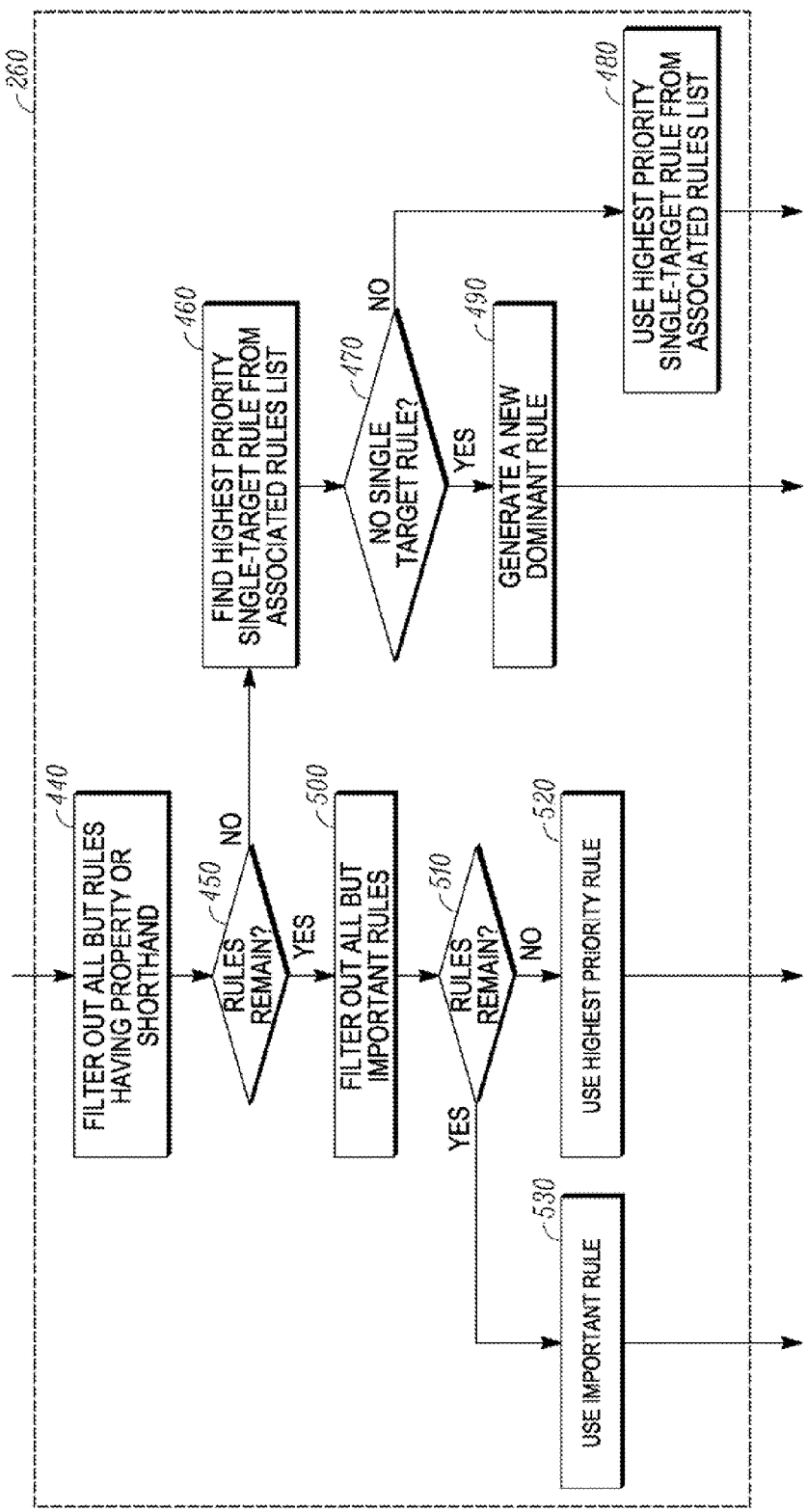

Turning now to FIGS. 3-6 and with continued reference to FIG. 2, flowcharts illustrate styling methods that can be performed by the styling system 130 in accordance with exemplary embodiments. As can be appreciated in light of the disclosure, the order of operation within the methods is not limited to the sequential performance as illustrated in FIGS. 3-5, but may be performed in one or more varying orders as applicable and in accordance with the present disclosure. As can be appreciated, one or more steps can be added or deleted from the method without altering the spirit of the method.

In one example, the method may begin at 200. The web document 140 is processed for each element at 210-340. For example, for each element at 210, the associated rules list 144 is determined based on the style sheets 138 at 220. If there are no rules associated with the element at 230, a new rule similar to the overriding rule 148 is generated at 240, for example, similar to the overriding rule 148 and based on another rule for the property of another element that has a highest specificity.

If, however, rules do exist for the element at 230, each property associated with the element is processed at 250-320. For example, for each property at 250, one or more filters are applied to the multiple rules at 260, and the dominant rule 146 is identified based on the filtering at 270. If grouping is intended of the property at 280 (i.e., multiple elements to use the same rule for styling particular properties), an overriding selector is generated based on the dominant rule 270 at 290. Thereafter, the method continues with processing each property.

Otherwise, if grouping is not intended at 280, it is determined whether the rule affects multiple elements at 300. If the rule does not affect multiple elements at 300, the dominant rule 270 is used at 310. If, however, the rule does affect multiple elements at 300, the overriding rule 148 is generated at 320. Thereafter, the method continues with processing each property at 250.

Once the processing of each property is complete at 250, it is determined whether grouping is intended at 330. If grouping is not intended at 330, the method continues with processing each element at 210. If, however, grouping is intended at 330, the group selector is determined from the overriding selectors as the overriding selector with the highest specificity at 340. Thereafter, the method continues with processing each element at 210.

Once the processing of each element is complete at 210, it is determined whether grouping is intended at 350. If grouping is intended at 350, a group overriding rule is generated using the group overriding selectors for each group element at 360. The updated style sheets are generated based on the group overriding rules, the overriding rules, the dominant rules, and/or the new rules at 370. The web document 140 is formatted and displayed based on the style sheets at 380. The method may end at 390.

In FIG. 4, the step 210 of determining the associated rules list 144 is illustrated in more detail in accordance with various embodiments. At 400, the element(s) 142 of the web document 140 are determined or received. The style sheets 138 are processed at 410 to determine rules that are associated with the element(s) 142. The associated rules are processed at 420 to determine rules associated with a particular property of the element(s) 142. The associated rules list 144 is generated based on the elements, the rules, and the properties at 430.

In FIG. 5, the step 260 of applying the filters to the associated rules list 144 is illustrated in more detail in accordance with various embodiments. At 440, the associated rules list is filtered for rules that include the property or the shorthand property. If there are no rules with the property or shorthand property at 450, a highest-priority single target rule is found from the associated rules list 144 at 460. If a single target rule is found, the highest priority single-target rule is used as the dominant rule at 490. If, however, no single target rule exists at 470, a new rule is generated at 480.

If however, rules with the property or shorthand property do remain at 450, the important filter is applied to the associated rules list 144 to filter out all but the important rules at 500. If there are no important rules at 520, the highest priority rule is used as the dominant rule at 520. If, however, an important rule remains, the important rule is used as the dominant rule at 530.

Figure 6:
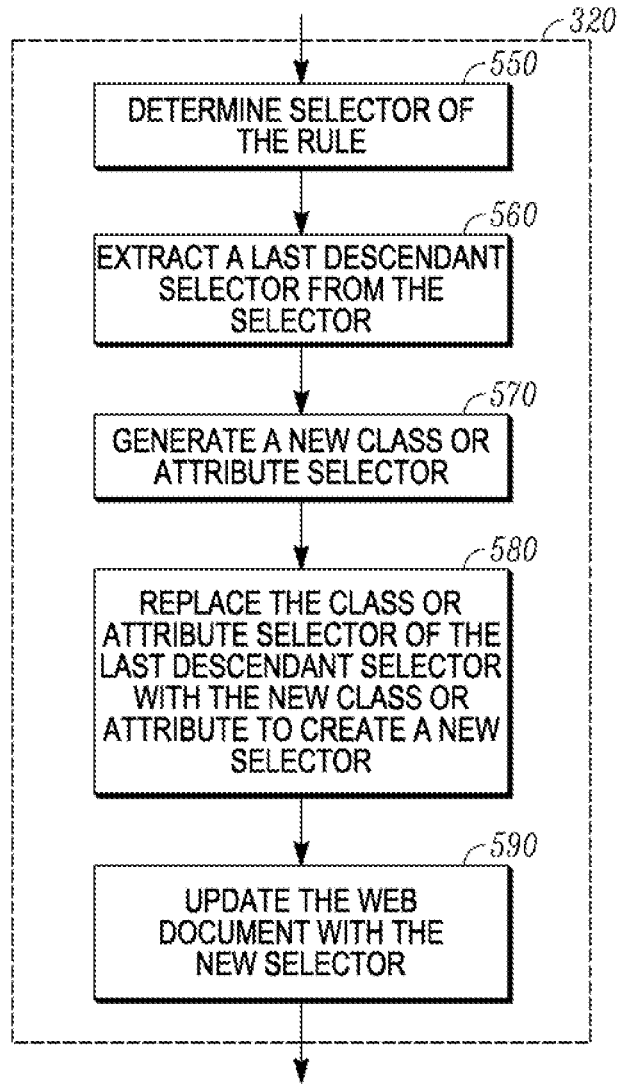

In FIG. 6, the step 320 of generating an overriding rule 148 based on the dominant rule 146 is illustrated in more detail in accordance with various embodiments. At 550, the selector for the rule is determined. The last descendant selector is extracted from the selector at 560. A new class selector is generated at 570. The new class selector is used to replace the class or attribute selector of the last descendant selector at 580 to create a new selector. The web document 140 is updated with the new selector at 590 by appending the new class selector to the element's class attribute.

As can be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of styling elements of a web document at a time of rendering the web document, comprising:
performing on a processor:
for each element of a plurality of elements in the web document:
determining an associated rule list for the element in the web document;
determining whether one or more rules for the element exists in the associated rule list;
generating the one or more rules for the element when no rule for the element is determined to exist in the associated rule list;
applying one or more filters to the one or more rules, the one or more filters comprising at least one of an important filter, a highest priority filter, and a single target filter;
determining a dominant rule from the one or more rules for each property of a plurality of properties in the element based on the one or more filters; and
determining a grouping of dominant rules from the plurality of properties;
determining a grouping of the plurality of elements;
generating a group overriding rule based on the grouping of dominant rules from each element in the grouping of the plurality of elements; and
updating a style sheet based on the group overriding rule.

2. The method of claim 1, wherein the generating the group overriding rule comprises modifying a selector of the dominant rule.

3. The method of claim 2, further comprising updating the web document based on the modifying of the selector of the dominant rule.

4. The method of claim 2, wherein the modifying the selector comprises:
generating a new class or attribute selector; and
modifying the selector to include the new class or attribute selector.

5. The method of claim wherein the modifying the selector comprises:
generating an overriding selector for each element of the plurality of elements; and
providing each of the overriding selectors in the selector.

6. The method of claim wherein the generating the overriding selector comprises:
determining an overriding selector for each property of the plurality of properties; and
selecting one of the overriding selectors with highest specificity among the overriding selectors for the plurality of properties.

7. The method of claim 6, further comprising:
identifying the dominant rule based on a plurality of rules, and
wherein the generating the overriding selector is based on the dominant rule.

8. The method of claim 1, further comprising:
determining whether to group a property of the plurality of properties across the plurality of elements for applying a same rule to the property in each of the plurality of elements; and
generating an overriding selector for the property when the property is determined to be grouped across the plurality of elements.

9. The method of claim 1, further comprising:
formatting the plurality of elements based on the updated style sheet; and
providing for display a rendering of the web document with the formatted plurality of elements.

10. A system for styling elements of a web document at a time of rendering the web document, comprising:
one or more processors; and a machine-readable medium comprising instructions stored therein, which when executed by the processors, cause the processors to perform operations comprising:

for each element of a plurality of elements of the web document:
- determining an associated rule list for the element in the web document;
- determining whether one or more rules for the element exists in the associated rule list;
- generating the one or more rules for the element when no rule for the element is determined to exist in the associated rule list;
- applying one or more filters to the one or more rules, the one or more filters comprising at least one of an important filter, a highest priority filter, and a single target filter;
- determining a dominant rule from the one or more rules for each property of a plurality of properties in the element based on the one or more filters; and
- determining a grouping of dominant rules from the plurality of properties;

determining a grouping of the plurality of elements;

generating a group overriding rule based on the grouping of dominant rules from each element in the grouping of the plurality of elements; and updating a style sheet based on the group overriding rule.

11. The system of claim 10, wherein generating the group overriding rule comprises modifying a selector of the dominant rule.

12. The system of claim 11, wherein the operations further comprise updating the web document based on the modifying of the selector of the dominant rule.

13. The system of claim 11, wherein modifying the selector comprises:
- generating a new class or attribute selector; and
- modifying the selector to recite the new class or attribute selector.

14. The system of claim 11, wherein modifying the selector comprises:
- generating an overriding selector for each element of the plurality of elements; and
- providing each of the overriding selectors in the selector.

15. The system of claim 14, wherein generating the overriding selector comprises:
- determining the overriding selector for each property of the plurality of properties; and
- selecting one of the overriding selectors with highest specificity among the overriding selectors for the plurality of properties.

16. The system of claim 15, further comprising identifying the dominant rule based on a plurality of rules, and wherein the overriding selector is determined based on the dominant rule.

17. The system of claim 11, wherein the operations further comprise:
- determining whether to group a property of the plurality of properties across the plurality of elements for applying a same rule to the property in each of the plurality of elements; and
- generating an overriding selector for the property when the property is determined to be grouped across the plurality of elements.

18. The system of claim 11, wherein the operations further comprise:
- formatting the plurality of elements based on the updated style sheet; and
- providing for display a rendering of the web document with the formatted plurality of elements.

19. A computer program product for styling elements of a web document at a time of rendering the web document, the computer program product comprising:

a non-transitory tangible storage medium readable by a processing circuit and storing instructions for execution by the processing circuit for performing a method comprising:

for each element of a plurality of elements of the web document:
- determining an associated rule list for the element in the web document;
- determining whether one or more rules for the element exists in the associated rule list;
- generating the one or more rules for the element when no rule for the element is determined to exist in the associated rule list;
- applying one or more filters to the one or more rules, the one or more filters comprising at least one of an important filter, a highest priority filter, and a single target filter;
- determining a dominant rule from the one or more rules for each property of a plurality of properties in the element based on the one or more filters; and
- determining a grouping of dominant rules from the plurality of properties;

determining a grouping of the plurality of elements;

generating a group overriding rule based on the grouping of dominant rules from each element in the grouping of the plurality of elements; and updating a style sheet based on the group overriding rule.

20. The computer program product of claim 19, wherein the method further comprises:
- determining whether to group a property of the plurality of properties across the plurality of elements for applying a same rule to the property in each of the plurality of elements; and
- generating an overriding selector for the property when the property is determined to be grouped across the plurality of elements.

* * * * *

UNITED STATES PATENT AND TRADEMARK OFFICE
CERTIFICATE OF CORRECTION

PATENT NO.            : 9,600,458 B2                                Page 1 of 1
APPLICATION NO.       : 13/517802
DATED                 : March 21, 2017
INVENTOR(S)           : Eric Guzman et al.

It is certified that error appears in the above-identified patent and that said Letters Patent is hereby corrected as shown below:

In the Claims

Claim 5, Column 8, Line 35, "claim wherein" should read --claim 2, wherein--.

Claim 6, Column 8, Line 40, "claim wherein" should read --claim 5, wherein--.

Signed and Sealed this
Twenty-fourth Day of September, 2019

Andrei Iancu
*Director of the United States Patent and Trademark Office*